United States Patent Office 3,512,983
Patented May 19, 1970

3,512,983
PHOTOGRAPHIC LIGHT-SENSITIVE MATERIALS CONTAINING MORDANTED OXONOL DYES
Shigeru Watanabe, Teruo Kobayashi, and Kikuo Kubotera, Kanagawa, Japan, assignors to Fuji Shashin Film Kabushiki Kaisha, Kanagawa, Japan
Filed Feb. 11, 1966, Ser. No. 526,859
Claims priority, application Japan, Feb. 12, 1965, 40/7,675
Int. Cl. G03c 1/84
U.S. Cl. 96—84
19 Claims

ABSTRACT OF THE DISCLOSURE

A photographic light-sensitive material is disclosed, which contains a film base, and at least one layer having (a) an oxonol dye having no acid groups represented by the formula

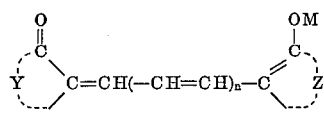

Figure 1:
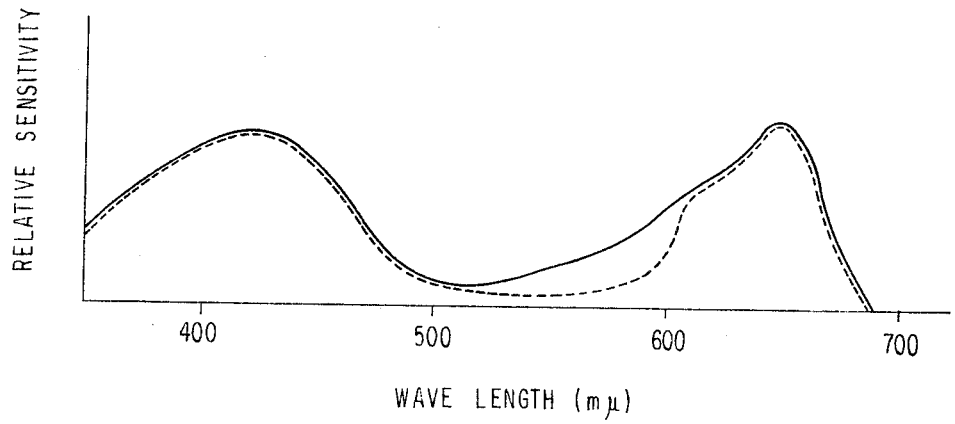

where Y and Z are substituted and unsubstituted carbon-ring forming groups and substituted and unsubstituted heterocyclic ring forming groups, M is H or $NHR_1R_2R_3$, where $R_1$, $R_2$ and $R_3$ are H, lower alkyl and lower hydroxyalkyl, and $n$ is 0, 1 or 2, and (b) a mordant of poly - N - vinyl-2-pyrrolidone and/or N-vinyl-2-pyrrolidone.

---

The present invention relates generally to color or black and white photography and more particularly to color or black and white photographic silver halide light-sensitive materials having improved filter layers, antihalation layers and/or anti-irridation layers.

A filter layer is a colored layer formed for correcting the color sensitivity of photographic emulsion layers. Antihalation and anti-irradiation layers are colored layers formed for absorbing the reflected, scattered or diffused lights of harmful colored lights. Such colored layers are formed on or under a photographic emulsion layer, between photographic emulsion layers, in a photographic emulsion layer, or on the back side of a support.

If colored dyes in such a filter layer, antihalation layer or anti-irradiation layer are diffused in adjacent emulsion layers, even in a slight amount during the production of the photographic films, during preservation of the films, or before exposure of the films, the photographic characteristics of the photographic film are reduced. Hence, the diffusion of such colored dyes must be completely prevented. Further, these colored dyes must be de-colored completely in photographic processing of the film or must be completely dissolved out of the film layer in the processing.

In order to provide the anti-diffusion property to dyes, the following methods have hitherto been known:

(1) An aliphatic long-chain alkyl group is chemically bonded to the structural component of a dye (cf., German Pats. 1,104,335 and 1,130,697, British Pat. 779,926 and Japanese patent publication No. Sho 36–19345). However, such a method has the drawback that the dye is not completely de-colored or dissolved off in the photographic processing and the photographic film containing such a dye is liable to be soiled.

(2) In order to prevent the transfer of dyes by diffusion a basic mordant, such as, the hydrolyzed product of polyethyl-N-vinyl-carbamate, a polymerization product of N-(N'-dialkylaminoalkyl) maleinimide, or the reaction product of polyethylene imine and urea is used together with a water-soluble dye (British Pats. 830,189 and 906,083, and German Pat. 1,095,120). However, not only is the complete prevention of the diffusion of the dye difficult, even if such a mordant is used, but also, if a large proportion of the mordant, that is, a basic high-molecular electrolyte is added, the adhesive property of the emulsion layer is extremely lowered. Moreover, when such a basic mordant is mixed with an acid dye having a sulfone group and carboxyl group in a medium such as gelatin, it causes precipitation and forms particles scattering light. Hence, the use of such a mordant is unsuitable for filter layers, antihalation layers or anti-irradiation layers.

(3) A dye having an OH group or an $NH_2$ group is chemically bonded, as a form of ester or amide, to the copolymerization product of N-vinylpyrrolidone and unsaturated acid chloride (French Pat. 1,303,090). However, there are drawbacks in such a method in that the synthesis of the unsaturated acid chloride is difficult and also the synthesis of the dye by the reaction of such an unsaturated acid chloride and N-vinylpyrrolidone is difficult.

(4) A water-insoluble dye is dissolved in a high-boiling-point, water-insoluble, organic solvent and then the solution is dispersed in gelatin-so-called oil-dispersion method. However, there is a fault in this method in that the amount of the dye per unit area of coating is reduced by an amount corresponding to the amount of the oil.

Therefore, an object of this invention is to prevent the diffusion of dyes by using a polymer containing N-vinyl-2-pyrriolidone as a mordant. That is, the photographic light-sensitive material of this invention has at least a layer contining the oxonol dye having no acid group and shown by the following formula:

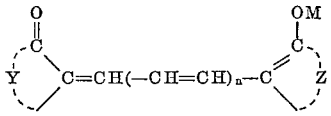

wherein Y and Z each represents an unsubstituted or substituted carbon- or heterocyclic-ring forming group, M represents H or $N.R_1R_2R_3$ (where $R_1$, $R_2$, and $R_3$ each represents H, a lower alkyl group, or a lower hydroxyalkyl group) and $n$ is 0, 1 or 2, said layer having incorporated therein poly-N-vinyl-2-pyrrolidone or a copolymer containing N-vinyl-2-pyrrolidone.

As the ring formed by Y or Z in the above general formula, there are a pyrazolone ring, an iso-oxazolone ring, a barbituric acid ring, a thio-barbituric acid ring, a 3-oxythionaphthene ring, a 1, 3-indandione ring, or a rhodanine ring.

Bonding of the dye and the mordant must be selected such that it is too strong to remove the dye at processing and it is too weak to diffuse the dye. The mordant in this invention is ineffective to acid oxonol dyes having sulfo groups or carboxyl groups.

The dyes shown by the above-mentioned general formula are disclosed in British Pat. 506,385 and U.S. Pat. 2,621,125, but since they are slightly dissolved in water, even though they have no sulfo groups and no carboxyl groups, they are diffused into adjacent layers. However, the diffusion of the dyes having the above general formula can be completely prevented by adding together polyvinyl pyrrolidone or a copolymer containing polyvinyl pyrrolidone. In particular, among the dyes which may be used in the invention are the symmetric or asymmetric oxonol dyes, substituted with a carboxylalkyl (that is, ester type) and an oxyalkyl (that is, ether type) at the 3-position of the pyrazolone. These dyes have the following advantages. The dyes shown in the above-mentioned British Pat. 506,385 and U.S. Pat. 2,621,125 are the symmetric or asymmetric oxonol dyes in which the 3-position of the pyrazolone is substituted with a methyl group. However, as compared with these dyes, the dye wherein the 3-position of the pyrazolone is the ester type or the ether type has a high solubility in methanol or an aqueous or alcohol solution of the mordant polymer of this invention. Therefore, an aqueous gelatin solution having a high concentration of the dye and likewise, a colored layer having a high color density can be obtained even though the layer is thin. Further, since the maximum absorption of the ester type dye is shifted to the wave length side about 1025 mμ longer than that of the methyl-substituted type dye and the maximum absorption of the ether type dye is shifted to the wave length side about 10–20 mμ shorter than that of the methyl-substituted dye, the selection in the case of adapting it to the maximum light sensitivity of photographic emulsion or in the case of removing a harmful light-sensitive wave length region by absorption becomes profitable. Moreover, the formation of fog and the reduction of sensitivity are less and de-coloring of the dye is good.

If the molecular weight of polyvinyl pyrrolidone or a copolymer thereof is too small, the diffusion preventing effect is reduced and hence polyvinyl pyrrolidone or the copolymer having a molecular weight of about 2500 and dispersible in water is desirable. As the copolymer, there are the copolymers of vinylpyrrolidone and vinyl acetate, acrylic acid ester, methacrylic acid ester, vinyl chloride, styrene, acrylonitrile, vinylalkyl ether, and the like. The effect of the copolymer is high as the content of vinylpyrrolidone is high and the copolymer becomes almost ineffective if the content of vinylpyrrolidone is less than 20% by weight.

In order to incorporate the above-mentioned copolymer in a light-sensitive material, the copolymer may be directly added to a coating solution for an antihalation layer, anti-irradiation layer or filter layer containing the dye, or may be incorporated in a layer adjacent thereto. In the latter case, the dye is transferred by diffusion into the adjacent layer containing the copolymer, wherein the diffusion of the dye into the other layer is prevented.

Since the pH of the mordant used in this invention is less than 7, the reduction in sensitivity and the formation of fog in the photographic light-sensitive emulsion are less than those of the case wherein a conventional basic mordant is used. Further, since the oxonol dye is used in this invention has no acid radicals, the diffusion of the dye can be completely prevented by the mordant of this invention having almost no basicity. Also, the dye which is weakly soluble in water can be uniformly contained in an aqueous gelatin solution. The reason for preventing the dye from being diffused into an adjacent layer, besides that the bonding force between the dye and the mordant is suitable, is considered to be that the solubility of the dye in its layer is increased by the presence of the mordant higher than that in the adjacent layer containing no mordant.

For forming the colored layer in this invention, for example, the dye is added in an organic solvent miscible with water, such as methanol, and is mixed with an aqueous or alcohol solution of the mordant. The system is then dispersed in an aqueous solution of a hydrophilic colloid medium, such as gelatin or polyvinyl alcohol, and then, after coating on a support or a photographic emulsion layer, dried to provide the colored layer.

The proportion of the mordant is preferably from 0.5 to 10 parts by weight, most preferably from 0.5 to 5 parts by weight to 1 part by weight of the dye. If the amount of the mordant is less than 0.5 part by weight, the effect is low and, if larger than 10 parts by weight, the adhesivity of the layer containing it to adjacent layers becomes lowered.

The reason why the dye having neither a sulfone group nor carboxyl group is de-colored and dissolved off in the present invention is considered to be caused by the fact that the dye is converted into a water-soluble material and at the same time is de-colored by reduction during photographic processing by the additions reaction with sodium sulfite or sodium hydrogen sulfite.

Typical examples of the dye used in this invention are as follows:

Dye I

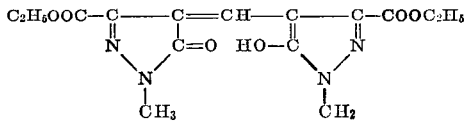

(The color of the colored gelatin layer is yellow)

Dye II

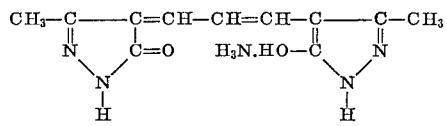

(The color of the colored gelatin layer is red)

Dye III

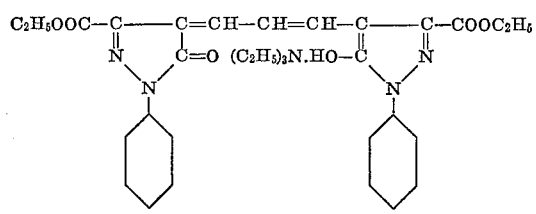

(The color of the colored gelatin layer is red-purple)

Dye IV

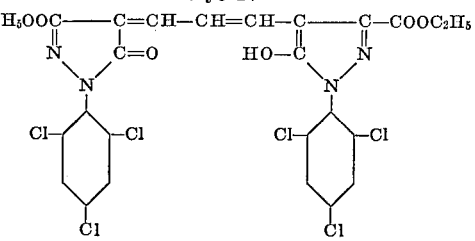

(The color of the colored gelatin layer is red-purple)

Dye V

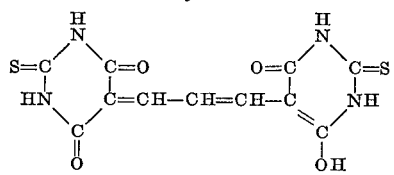

(The color of the colored gelatin layer is orange-red)

Dye VI

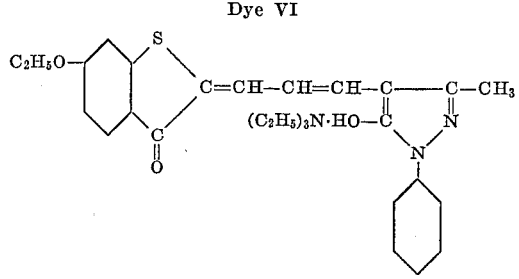

(The color of the colored gelatin layer is red-purple)

Dye VII

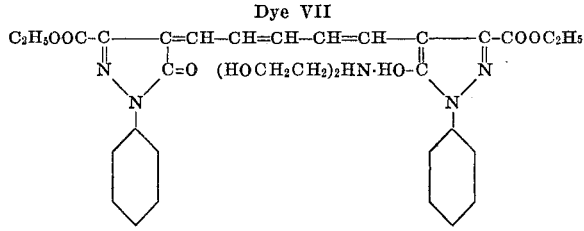

(The color of the colored gelatin layer is blue)

Dye VIII

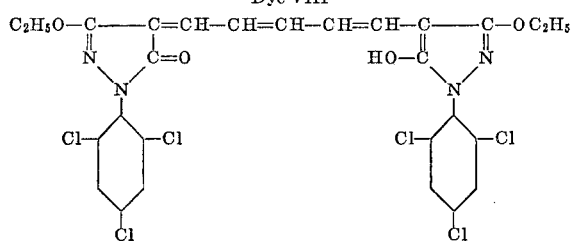

(The color of the colored gelatin layer is blue)

Dye IX

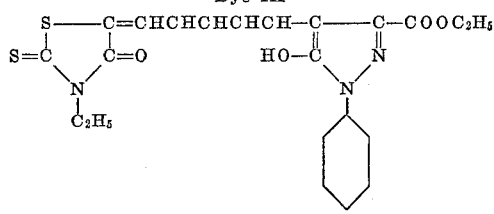

(The color of the colored gelatin layer is blue-green)

Dye X

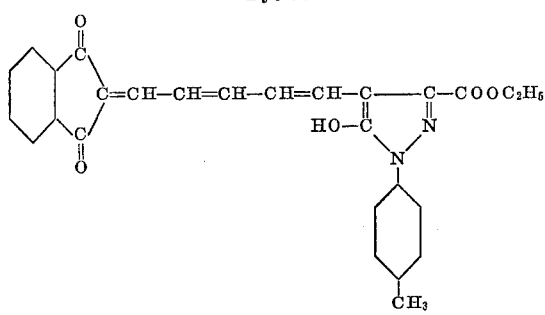

(The color of the colored gelatin layer is blue-purple)

These dyes may be prepared by known methods. That is, the symmetric dye corresponding to the afore-mentioned general formula wherein $n$ is 0, 1, or 2 is synthesized, as described in British Pat. 506,385 and 646,125 by the condensation of 2 mols of a compound having an active methylene group in the ring with 1 mol of formamidine, malondialdehyde dianil, or glutacondialdehyde dianil in alcohol in the presence of a condensing agent such as triethylamine. The asymmetric dye may be obtained by the methods disclosed in U.S. Pat. 2,621,125, and British Pat. 624,462 (pentamethine oxonol dye), and U.S. Pat. 2,611,696 and British Pat. 663,042 (monomethine and polymethin oxonol dyes). That is, 1 mol of the compound shown by the general formula:

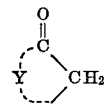

and 1 mol of the above-mentioned dianil are reacted to provide the intermediate product having the following formula:

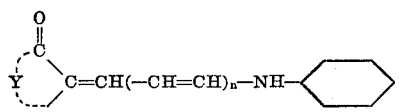

The condensation reaction is conducted in a non-polar solvent such as ligroin or in an alcoholic solvent under the presence of pyridine or triethylamine. Thereafter, 1 mol of the intermediate product is reacted with 1 mol of the compound shown by the general formula:

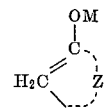

in alcohol or using a condensing agent, such as triethylamine, in pyridine to give the asymmetric oxonol dye. Typical examples of the synthesis of the dyes are as follows:

SYNTHESIS OF DYE III

In a solution of 46.4 g. (0.2 mol) of 1-phenyl-3-carboxyethyl-5-pyrazolone, 30.3 g. (0.3 mol) of triethylamine, and 200 ml. of isopropylalcohol there was added 22.2 g. (0.1 mol) of malondialdehyde dianil with stirring. The mixture was reacted for several hours at about 20–80° C. and then cooled for one night to precipitate a crystal, which was recovered by filtration and recrystallized from methanol of 6 ml. per 1 g. of the crystal to provide 55 g. (yield 92%) of Dye III having the melting point of 140–141° C. The maximum absorption wave length of a 5 p.p.m. methanol solution of Dye III is 562 m$\mu$ and the extinction coefficient is 0.74.

On the other hand, Dye III having no triethylamine group was prepared by adding into the methanol solution of Dye III a theoretical amount of hydrochloric acid and then adding water into the system. The melting point of Dye III having no thiethylamine group is 162–163° C., the maximum absorption wave length of a 5 p.p.m. methanol solution of the dye is 560 m$\mu$, and the extinction coefficient is 0.81.

SYNTHESIS OF DYE VIII

Into a solution of 61.5 g. (0.2 mol) of 1-(2,4,6-trichlorophenyl)-3-ethoxy-5-pyrazolone, 40.4 g. (0.4 mol) of triethylamine, and 200 ml. of ethanol was added 28.4 g. (0.1 mol) of glutacondialdehyde dianilide hydrochloride. They were reacted for about 10 hours at about 20–30° C. with strring or for about 1 hour at 80° C. and then ligroin was added into the reaction liquid to crystallize the product completely. The product was recrystallized from a mixed solution of alcohol and ligroin to provide 65 g. of Dye VIII having a melting point of 236–238° C. The maximum absorption wave length of a 5 p.p.m. solution of Dye VIII is 603 m$\mu$ and the extinction coefficient is 1.03.

SYNTHESIS OF DYE IX

The intermediate product having the following formula:

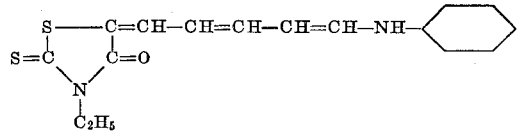

5 - ($\omega$ - anilido - $\Delta$ - 2:4 - pentadienilidene)-3-ethyl-rhodanine was first synthesized by a method similar to that disclosed in British Pat. 624,462. That is, the intermediate product was obtained by reacting N-ethyl-rhodanine and an equi-molecular amount of glutacondialdehyde dianilide hydrochloride in absolute ethanol in the presence of triethylamine under refluxing. By recrystallizing from ethanol, a purple crystal of a decomposition point of 199° C. was obtained. Analytical value: C—60.56% (60.76%), H—5.29% (5.06%), and N—8.7% (8.86%) wherein the values shown in the parentheses are calculated values.

The above-prepared intermediate product and an equi-molecular amount of 1-phenyl-3-carboxyethyl-5-pyrazolone were, as described in the British patent, dissolved in pyrridine, reacted under refluxing in the presence of triethylamine, and the product was precipitated with the addition of ether, which was recovered by filtration and recrystallized from alcohol to provide the shine green crystal of Dye IX. The maximum absorption of a 5 p.p.m. methanol solution of the dye is at 680 mμ and the extinction coefficient thereof is 1.1.

The following are examples of the present invention.

Example 1

In to 5 ml. of methanol were dissolved 10 mg. of Dye I and 20 mg. of polyvinyl pyrrolidone (average molecular weight 10,000). The solution was with an aqueous solution of 20 g. of gelatin and 100 g. of water. The yellow-colored solution was applied as a filter layer to an emulsion layer followed by drying and then an aqueous colorless 20% gelatin solution was applied to the colored layer followed by drying.

When the cross-section of the thus prepared multi-layered film was observed by means of a microscope, no diffusion of yellow Dye I into the upper gelatin layer was observed.

On the other hand, when the same procedure was repeated without adding polyvinyl pyrrolidone in the colored layer for comparison, the diffusion of the yellow dye was observed.

Furthermore, when the multi-layered film having the colored layer containing polyvinyl pyrrolidone was subjected to developing treatment, the dye was de-colored and dissolved off.

Example 2

Into 10 ml. of an aqueous 10% gelatin solution was added a methanol solution of 10 mg. of Dye II and 5 ml. of methanol and the red gelatin solution was applied as a filter layer to an emulsion layer followed by drying. Thereafter, 10 ml. of a colorless 10% gelatin solution containing 30 mg. of a copolymer of N-vinylpyrrolidone and vinyl acetate (3:7 in polymerization ratio) having the average molecular weight of 40,000 was coated on the thus formed layer and dried. When the cross-section of the multi-layered film was observed by means of a microscope, it was observed that red Dye II has been transferred into the upper layer containing the copolymer mordant. That is, it was confirmed that the copolymer of N-vinylpyrrolidone has a mordant effect on the dye. The dye was further de-colored by development.

Example 3

Into 1 kg. of a light-sensitive emulsion for a color-photographic, red-sensitive layer was added a solution of 0.8 g. of Dye IV, 1.5 g. of a copolymer of N-vinylpyrrolidone and vinyl acetate (8:2 in polymerization ratio) having an average molecular weight of 50,000, and 80 ml. of methanol and the solution was coated in thickness of about 5μ. In the thus formed red-sensitive emulsion layer, green-sensitivity was markedly suppressed and the color separation was improved by the anti-irradiation effect and the filter effect. This is explained by referring to FIG. 1, in which the solid line shows the spectral sensitivity of the red-sensitive layer. When Dye III was incorporated in the layer, the spectral sensitivity was changed, as shown by the dotted line, which shows the harmful green-sensitivity being markedly reduced. The colored emulsion layer was de-colored when the film was subjected to color photographic processing.

Example 4

Figure 2:
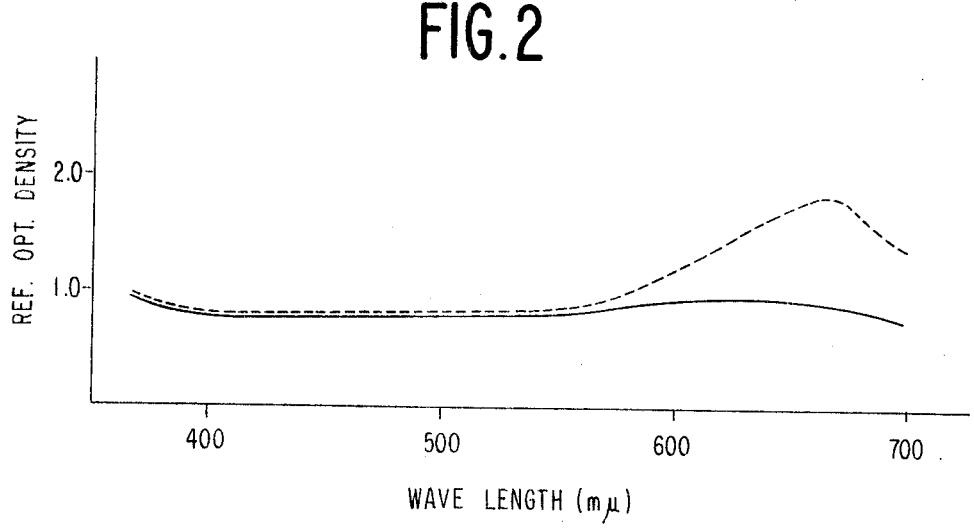

In thecase where an antihalation layer is placed between a film base and an emulsion layer, colloidal silver or a colloid of another metal has hitherto been used and in such a conventional layer, a strong antihalation effect to red light is not obtained as shown by the solid line in FIG. 2. When 1 mg. of Dye IX and 4 mg. of polyvinyl-pyrrolidone (average molecular weight 160,000) per 100 sq. cm. of coated area were incorporated in the layer, the line was changed to the dotted line, which indicates that the red reflection density is increased. That is, the antihalation effect is increased. The same result was obtained when the layer was formed at the back side of the film base. The antihalation layer was de-colored when subjected to color film treatment.

Example 5

An emulsion for a red-sensitive layer for color photographic film has some light sensitivity to green light. It is natural that if the green sensitivity is lowered the color reproducing property of the color photographic film is improved. For the purpose a gelatin filter layer absorbing green light is usually formed on the red-sensitive layer. In the example, such a gelatin filter layer was formed by mixing in 10 liter of an aqueous 10% gelatin solution, a solution of 1 g. of Dye VI, 1.5 g. of a copolymer of N-vinylpyrrolidone and methyl methacrylate (8:2 in polymerization ratio) having an average molecular weight of 100,000 and 100 ml. of 50% methanol and coating the solution in the amount of about 5 ml. per 100 cm.² of area followed by drying. By the formation of the layer, almost the same improvement in color-sensitivity as shown in FIG. 1 was obtained.

Example 6

Between a green-sensitive layer and a red-sensitive layer of a color photographic film was placed the following colored layer. That is, 0.1 g. of Dye III and 0.1 g. of polyvinylpyrrolidone (average molecular weight 360,000) were dissolved into 10 ml. of 50% ethanol, the solution was added to 1 liter of an aqueous 10% gelatin solution, and the mixture was coated on the red-sensitive layer with the addition of a hardening agent followed by drying. By the presence of the colored layer, the halation of the upper green-sensitive layer is prevented effectively and the resolving power is improved. The colored layer also acts as a filter layer for the lower red-sensitive layer to improve the color sensitivity. Further, the colored layer was de-colored when the film was subjected to color photographic processing.

On the other hand, when polyvinylpyrrolidone was not incorporated in the colored layer, Dye III which absorbed green light was diffused into the green-sensitive layer, where it absorbed effective light to reduce the sensitivity.

Example 7

Between a panchromatic emulsion layer for black and white photographic material and a film base was placed an antihalation layer prepared as follows. That is, a solution of 0.1 g. of Dye I, 0.2 g. of Dye V, 0.3 g. of Dye VII, 1 g. of a copolymer of N-vinylpyrrolidone and vinyl acetate (4:6 in polymerization ratio) having an average molecular weight of 160,000. 0.5 g. of a polyvinylpyrrolidone having an average molecular weight of 160,000, and 150 ml. of methanol was added to 1 liter of an aqueous 7% gelatin solution. The solution was further mixed with 20 ml. of an aqueous 0.5% chrome alum solution as a hardening agent with stirring and coated on a film base followed by drying. The layer effectively prevented halation and de-colored when subjected to development, fixing, and water-washing completely.

What is claimed is:
1. A photographic light-sensitive silver halide material comprising,
a film base and
at least one layer consisting essentially of a hydrophilic colloid medium,
the oxonol dye represented by the general formula

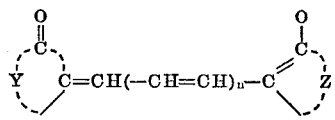

wherein the rings formed by Y and Z are each members selected from the group consisting of pyrazolone, iso-oxazolone, barbituric acid, thio-barbituric acid, 3-oxythionaphthene, 1,3-indandione, rhodanine; and substituted forms thereof having no acid groups; M represents a member selected from the group consisting of H and H.NR₁R₂R₃, where R₁, R₂ and R₃ each is a member selected from the group consisting of H, a lower alkyl group, and a lower hydroxyalkyl group; and $n$ is 0, 1 or 2, and at least one mordant selected from the group consisting of poly-N-vinyl-2-pyrrolidone and a copolymer containing N-vinyl-2-pyrrolidone.

2. The photographic light-sensitive material as claimed in claim 1 wherein the amount of said mordant is from 0.5 to 10 parts by weight per 1 part by weight of said dye.

3. The photographic light-sensitive material as claimed in claim 1 wherein the amount of said mordant is from 0.5 to 5 parts by weight per 1 part by weight of said dye.

4. The photographic light-sensitive material as claimed in claim 1 wherein the molecular weight of said mordant is higher than 2500.

5. The photographic light-sensitive material as claimed in claim 1 wherein said mordant is the copolymer of vinylpyrrolidone and the proportion of vinylpyrrolidone in said copolymer is more than 20% in polymerization ratio.

6. The photographic light-sensitive material as claimed in claim 1 wherein said layer is selected from the group consisting of an antihalation layer, an anti-irradiation layer, a filter layer and a light-sensitive emulsion layer.

7. The photographic light-sensitive material as claimed in claim 1 wherein said oxonol dye is one represented by the formula:

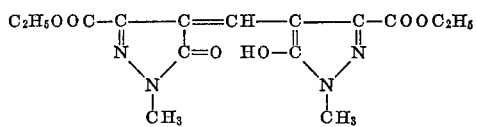

8. The photographic light-sensitive material as claimed in claim 1 wherein said oxonal dye is one represented by the formula:

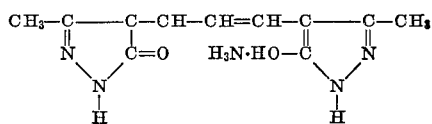

9. The photographic light-sensitive material as claimed in claim 1 wherein said oxonal dye is one represented by the formula:

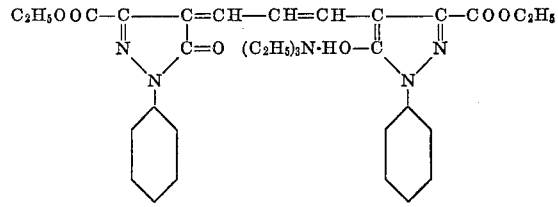

10. The photographic light-sensitive material as claimed in claim 1 wherein said oxonal dye is one represented by the formula:

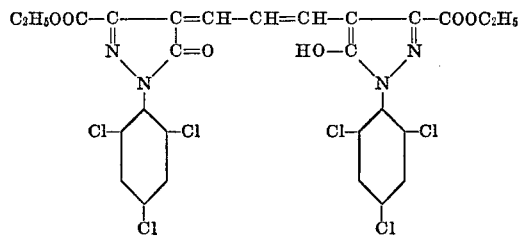

11. The photographic light-sensitive material as claimed in claim 1 wherein said oxonal dye is one represented by the formula:

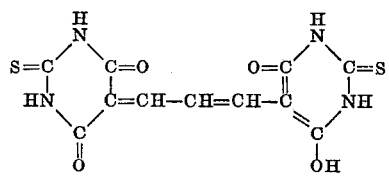

12. The photographic light-sensitive material as claimed in claim 1 wherein said oxonol dye is one represented by the formula:

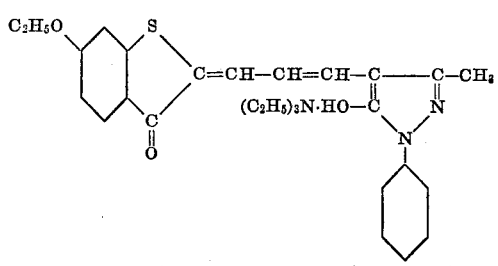

13. The photographic light-sensitive material as claimed in claim 1 wherein said oxonol dye is one represented by the formula:

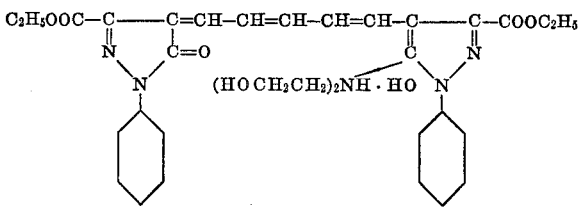

14. The photographic light-sensitive material as claimed in claim 1 wherein said oxonal dye is one represented by the formula:

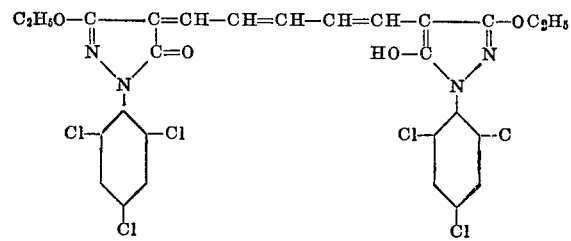

15. The photographic light-sensitive material as claimed in claim 1 wherein said oxonol dye is one represented by the formula:

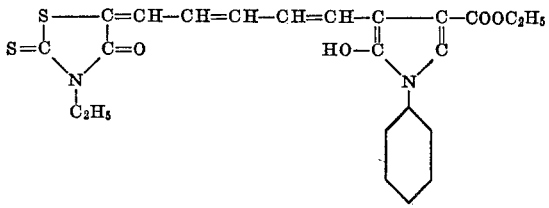

16. The photographic light-sensitive material as claimed in claim 1 wherein said oxonol dye is one represented by the formula:

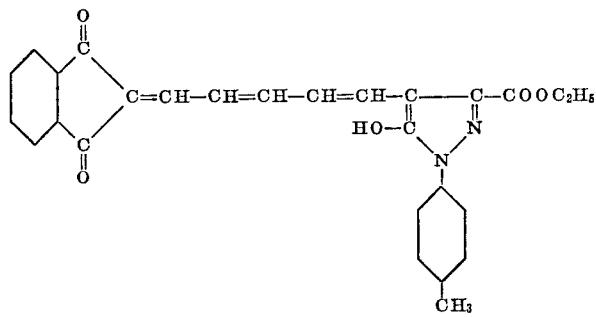

17. A photographic light-sensitive silver halide material comprising a film base, at least a layer consisting essentially of a hydrophilic colloid medium, the oxonol dye represented by the formula

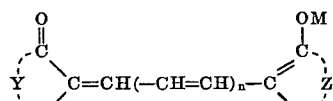

wherein the ring formed by Z and Y are each members selected from the group of pyrazolone, iso-oxazolone, barbituric acid, thio-barbituric acid, 3-oxythionaphthene, 1,3-indandione, rhodanine, and substituted forms thereof having no acid groups; M represents a member selected from the group consisting of H and $H.NR_1R_2R_3$ (where $R_1$, $R_2$ and $R_3$ each represents a member selected from the group consisting of H, a lower alkyl group, and a lower hydroxyalkyl group); and $n$ is 0, 1 or 2 and a layer adjacent said dye-containing layer, said adjacent layer having incorporated therein at least one mordant selected from the group consisting of poly-N-vinyl-2-pyrrolidone and a copolymer containing N-vinyl-2-pyrrolidone.

18. The photographic light-sensitive material as claimed in claim 6 wherein the molecular weight of said mordant is higher than 2500.

19. The photographic light-sensitive material as claimed in claim 6 wherein said mordant is the copolymer of vinylpyrrolidone and the proportion of vinylpyrrolidone in said copolymer is more than 20% in polymerization ratio.

References Cited

UNITED STATES PATENTS

| | | | |
|---|---|---|---|
| 3,352,673 | 11/1967 | Graham | 96—84 XR |
| 3,252,801 | 5/1966 | Cohen et al. | 96—84 |

FOREIGN PATENTS

| | | |
|---|---|---|
| 506,385 | 5/1939 | Great Britain. |

RONALD H. SMITH, Primary Examiner

U.S. Cl. X.R.

96—57